Figure 1:
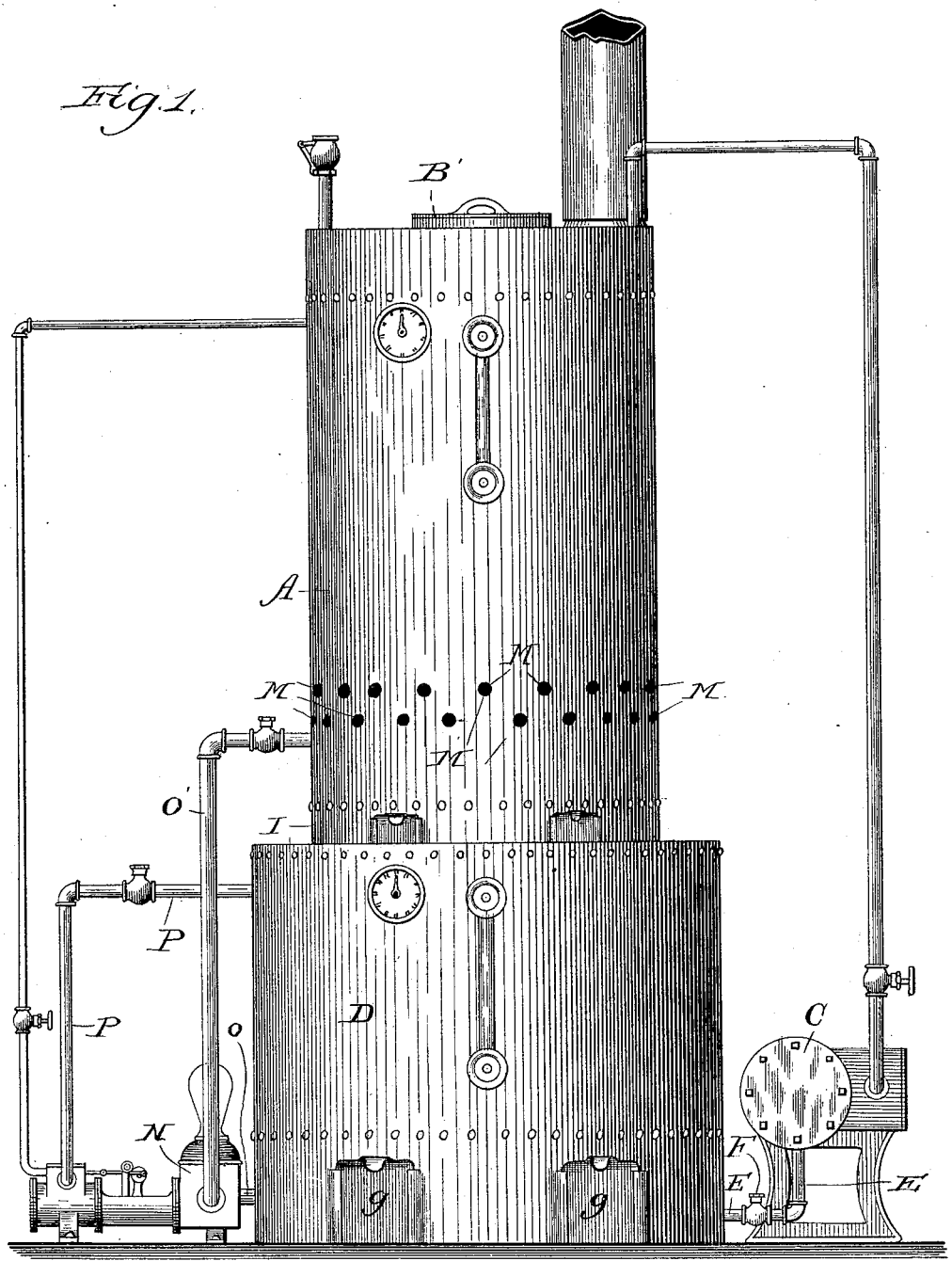

(No Model.) 2 Sheets—Sheet 1.

T. T. PROSSER.
UTILIZING PRODUCTS OF HEAT.

No. 366,875. Patented July 19, 1887.

Witnesses:
Chas. E. Gaylord,
Edward Thorpe.

Inventor:
Treat T. Prosser
By Charles T. Brown,
Att'y (No Model.)
2 Sheets—Sheet 2.

T. T. PROSSER.
UTILIZING PRODUCTS OF HEAT.

No. 366,875.
Patented July 19, 1887.

Witnesses:
Chas. E. Gaylord,
Edward Thorpe.

Inventor:
Treat T. Prosser
By Charles T. Brown
Att'y

UNITED STATES PATENT OFFICE.

TREAT T. PROSSER, OF LAKE SIDE, ASSIGNOR OF ONE-HALF TO JAMES B. WALLER AND FRANK S. OSBORNE, BOTH OF COOK COUNTY, ILLINOIS.

UTILIZING PRODUCTS OF HEAT.

SPECIFICATION forming part of Letters Patent No. 366,875, dated July 19, 1887.

Application filed September 6, 1886. Serial No. 212,799. (No model.)

*To all whom it may concern:*

Be it known that I, TREAT T. PROSSER, a citizen of the United States, residing at Lake Side, in the county of Cook and State of Illinois, have invented a new and useful Process for Utilizing Products of Heat, of which the following is a specification.

I am well aware that for many years motion has been derived from the application of heat to water and the utilization of the resulting steam or other products by the several processes heretofore known and embodied in the combination of mechanisms constituting what is termed "high-pressure non-condensing engines," "low-pressure condensing-engines," and the combined "high and low pressure" or "compound" engines, and that each of these processes has become generally used for a special kind or class of work because of its adaptability therefor—as, for instance, the low pressure and compound engines, where great power is required and abundant water can be obtained, and the high-pressure non-condensing engine on railroads, for portable engines, and for the majority of land purposes.

The "plant" required in the construction of the low-pressure engine or the compound engine is expensive in its first cost, difficult to maintain, and requires skilled workmen to control it. The operation of the various mechanisms termed "high-pressure engines" is usually attended with the production of large quantities of smoke, much noise, great waste of water, steam, and fuel, and other well-known objectionable features; and as in every business requiring motive power the expense of its production enters into the cost of maintaining and operating such business, a reduction in this expense is a matter of moment to those interested therein. A process, therefore, suitable for use in place of the process embodied in the present high-pressure engine, the low-pressure engine, or the compound engine, and which will do away with or lessen the objections inherent in each of said processes, is of importance to all brought in contact therewith. And the purpose of my invention is to secure a process of obtaining motive power from water by the application of heat thereto with less fuel, less oil, and less attention than any of the present processes or systems; to obviate the production of smoke, the making of noise from exhaust-steam, the ordinary and unnecessary waste of water, steam, and fuel, or the heat contained therein; to increase the capacity of the boiler for producing steam, and lessen the consumption of fuel in such increased production; to economically use the steam obtained; to abstract and utilize a large portion of the heat remaining in the steam produced and used after it has performed its work in the cylinder of the engine, which forms one of the steps in my process; to reuse the water secured by such abstraction of heat, and while said water contains a large proportion of the heat first applied thereto and yet remaining therein, and to use for purposes of fuel, in connection with the ordinary fuel supplied the fire-box, a product derived from the used steam by my treatment of the same.

To carry my invention into effect, I require a high-pressure steam-boiler for generating steam by heat, a high-pressure steam-engine connected with said boiler for using the steam when generated, a low-pressure boiler properly connected with the exhaust-pipes of said engine to receive the exhaust from the engine, and to act as a reservoir, as a condenser, and as a means for heating the air used for combustion in the furnace of the steam-generating boiler before its introduction into the fire-box of said furnace, and a force-pump specially adapted for pumping hot water and properly connected with said low-pressure boiler and with the high-pressure steam-boiler, so that the heated water from condensation contained in the low-pressure boiler may at any time be transferred to the steam-generating boiler as it may be required to keep up the water-supply in said boiler.

The high-pressure steam-generating boiler may be taken from any of the known types of high-pressure steam-boilers designed to make steam by fire—either a tubular, a locomotive, or an upright, as all of them may be adapted to the requirements of this system.

I have illustrated my process by drawings accompanying this specification and forming a part thereof. Said drawings were taken from a high-pressure boiler adapted and used by me in reducing my invention to actual operation.

Figure 2:
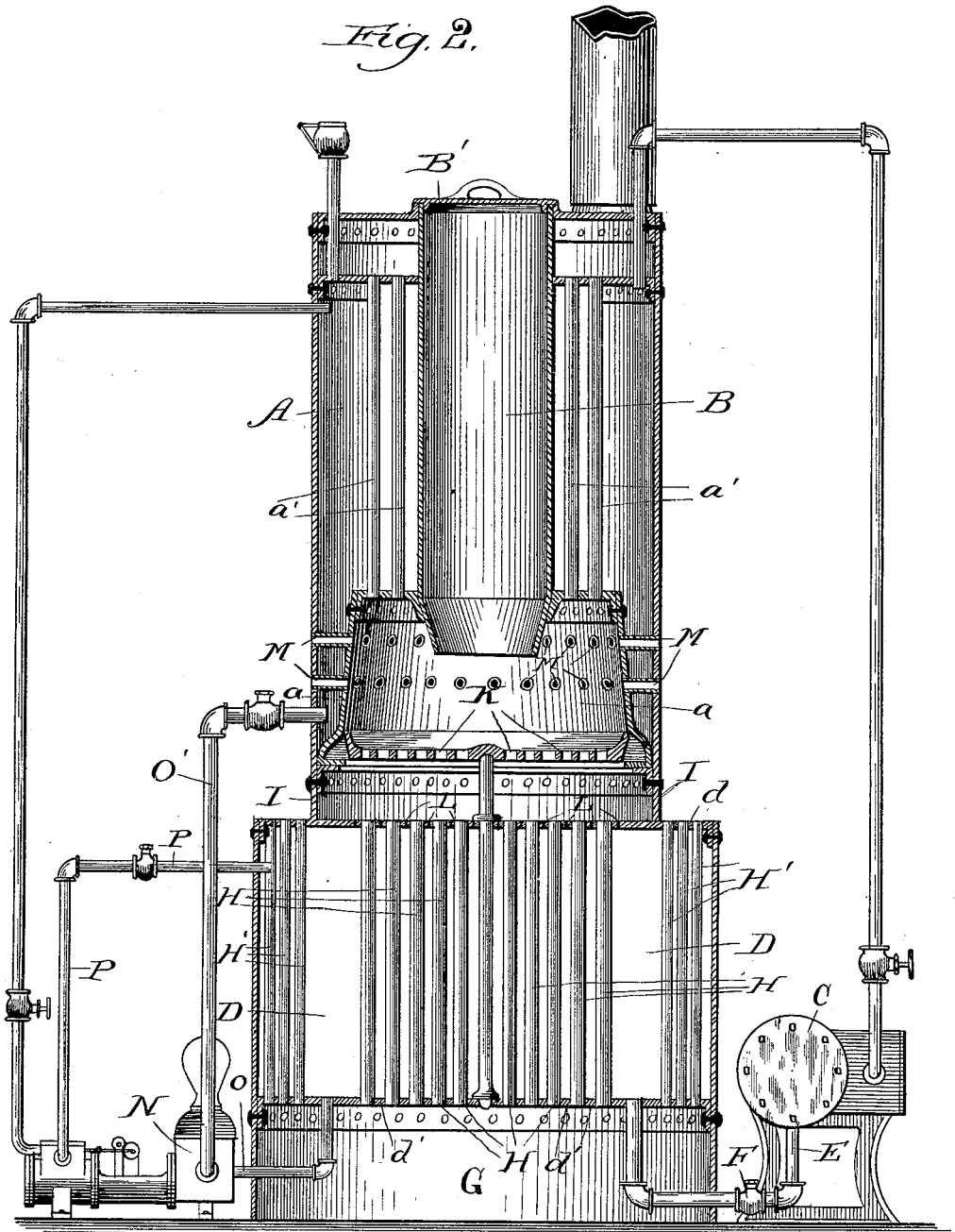

Figure 1 is an elevation of the boilers and engine used. Fig. 2 is a cross-section of the same.

The boiler A has an internal fire-box, a, at its base, flues M, extending to the open air, and vertical tubes or flues a', extending from the top of said fire-box to the top of the boiler, said flues to be used for the escape of the volatile products of combustion from the fire-box and as heating tubes for the boiler. This boiler has a large flue or magazine, B, located over the grate, (the lower end of the flue extending into the furnace and the upper end through the top of the boiler and through the smoke-chamber,) provided with a tight-fitting cover, B', on its top, and used as a reservoir for coal, forming a channel through which the furnace may be fed with coal without the admission of cold air. This style of boiler was selected and used as one quite well adapted to meet all of the requirements necessary for carrying out successfully the working of my invention with a less amount of alteration and addition than any of the other classes or styles of boilers named.

The engine, C, used to operate in connection with the high-pressure steam-boiler A, to utilize the power of the steam and to form the connecting-link between the high-pressure steam-generating boiler and the low-pressure condensing-boiler D, was a slide-valve piston engine with a stroke twice the diameter of the cylinder, or what is sometimes called a "high-speed engine." The slide-valve used for the engine was a double-ender fitted for covering the two ports at each end of the cylinder. Said valve had a lap that cut off the entrance of the steam to the cylinder when the piston had traversed three-fourths of its stroke, and formed a connection with the exhaust-port when the piston had moved through nineteen-twentieths of the stroke, thus giving an exhaust lead of about one-twentieth of the stroke.

The two exhaust-ports of the engine were connected by separate pipes E E to the low-pressure condensing-boiler, so that whenever the engine was working it would discharge its exhaust-steam into the low-pressure boiler from each end of the cylinder through its corresponding pipe. In each of the exhaust-pipes near the condenser a check-valve, F, was inserted, and so adjusted as to open whenever the pressure on the side communicating with the engine should be the greater, and to close whenever the pressure in the low-pressure boiler or condenser should be the greater, being what is called a "self-acting" valve.

The low-pressure boiler used was constructed specially for the purpose. It was in diameter about one-half larger than the steam-generating boiler above described, and but a little over one-half as long; was vertical, with its heads so inserted that the top head, d, was nearly on a level with the top of the boiler, and the bottom head, d', such a distance from the bottom of the shell as to form an air-chamber, G, below the bottom head. This space was provided with openings, to which openings adjustable doors g were fitted. This boiler has two sets or series of vertical tubes or flues passing through it from the air-chamber to its top—an inner series, H, and an outer series, H', all used for the passage of air. The inner series, H, are inclosed by a skirting, I, that surrounds the bottom of the high-pressure boiler A and the fire-grate K, and rests on the top of the low-pressure boiler, and are directly beneath the grate and the high-pressure boiler. These tubes or flues are for the admission of air to the furnace from the air-chamber below them. The air may be admitted to the air-chamber through the doors or through the outer series of flues, as desired. In the upper head of the lower boiler, directly beneath the grate and between the air-flues, are a series of small holes, L L, uniformly arranged between the flues of the inner series for the purpose of permitting a certain amount of steam from the low-pressure steam-boiler to pass up into and through the burning fuel on the grate, with the heated air coming through the tubes or flues beneath the grate.

The pump, N, used by me is connected by pipe O with the exhaust-steam or low-pressure boiler, so as to take the water from that boiler and transfer it to the high-pressure boiler, to which it is properly attached by pipe O', and is propelled by the steam from the high-pressure boiler, which when used is discharged into the low-pressure boiler through connection P.

Having thus described my invention, what I claim, and desire to secure by Letters Patent, is—

1. In obtaining motion from water by the application of heat thereto, the process consisting of subjecting the water to heat in a high-pressure boiler, of using the steam resulting therefrom in a high-pressure engine, and of discharging the used steam into a low-pressure boiler or reservoir through a discharge pipe or pipes from the exhaust port or ports of said engine, said pipe having a suitable check-valve therein interposed between said engine and said reservoir, all substantially as described, and for the purpose set forth.

2. In obtaining motion from water by the application of heat thereto, the process consisting of subjecting water to heat in a high-pressure boiler, of using the steam resulting therefrom in a high-pressure engine, of discharging the used steam from each exhaust-port of said engine into a low-pressure boiler through separate discharge-pipes, having a suitable check-valve interposed between said engine and said low-pressure boiler, and of transferring the heated water obtained in said low-pressure boiler into the high-pressure boiler through proper connections, all substantially as described, and for the purpose set forth.

3. In obtaining motion from water by the application of heat thereto, the process consisting of subjecting the water to heat in a high-pressure boiler, of using the steam resulting therefrom in a high-pressure engine, of discharging the used steam from the exhaust port or ports of said engine into a low-pressure boiler through a discharge-pipe having a check-valve therein between said engine and said low-pressure boiler, of transferring the heated water obtained in said low-pressure boiler into said high-pressure boiler through suitable connections, and of supplying the furnace of said high-pressure boiler with air passed through flues in said low-pressure boiler, all substantially as described, and for the purpose set forth.

4. In obtaining motion from water by the application of heat thereto, the process consisting of subjecting the water to heat in a high-pressure boiler, of using the steam resulting therefrom in a high-pressure engine, of discharging the used steam from the exhaust port or ports of said engine into a low-pressure boiler through a discharge-pipe having a check-valve therein between said engine and said low-pressure boiler, of transferring the heated water obtained in said low-pressure boiler into said high-pressure boiler through suitable connections, and of supplying the furnace of said high-pressure boiler with air passed through flues in said low-pressure boiler, and with steam or other products of the application of heat to water from openings or holes in said low-pressure boiler connecting with the fire-box, all substantially as described, and for the purpose set forth.

5. In obtaining motion from water by the application of heat thereto, the process consisting of subjecting the water to heat in a high-pressure boiler, of using the steam resulting therefrom in a high-pressure engine, of discharging the used steam into a low-pressure boiler through separate discharge-pipes from each exhaust-port of said engine, each of said pipes having a check-valve interposed therein between said engine and said low-pressure boiler, of transferring the heated water obtained in said low-pressure boiler into the high-pressure boiler through suitable connections, and of supplying the furnace of said high-pressure boiler with steam or other products of the application of heat to water from openings or holes in said low-pressure boiler connecting with the fire-box of said furnace, all substantially as described, and for the purpose set forth.

6. In obtaining motion from water by the application of heat thereto, the process consisting of subjecting the water to heat in a high-pressure boiler, of using the steam resulting therefrom in a high-pressure engine, of discharging the used steam into a low-pressure boiler through separate discharge-pipes from each port of said engine, each of said pipes having a check-valve therein between said engine and said low-pressure boiler, of transferring the heated water obtained in said low-pressure boiler into the high-pressure boiler through suitable connections, and of supplying the furnace of said high-pressure boiler with steam or other products of the application of heat to water from openings or holes in said low-pressure boiler connecting with the fire-box of said furnace, and with air passing through openings or flues through the water-legs or space surrounding the fire-box of the high-pressure boiler from the open air to said fire-box, all substantially as described, and for the purpose set forth.

7. In obtaining motion from water by the application of heat thereto, the process consisting of subjecting the water to heat in a high-pressure boiler, of using the steam resulting therefrom in a high-pressure engine, of discharging the used steam into a low-pressure boiler through a discharge-pipe from the exhaust port or ports of said engine, said pipe having a check-valve interposed between said engine and said low-pressure boiler, of transferring the heated water obtained in said low-pressure boiler into said high-pressure boiler through suitable connections, and of supplying the furnace of said high-pressure boiler with air through flues in said low-pressure boiler, with air through openings or flues through the water-legs or space surrounding the fire-box of the high-pressure boiler from the open air to said fire-box, and with steam or other products of the application of heat to water from openings or holes in said low-pressure boiler connecting with the fire-box, all substantially as described, and for the purpose set forth.

8. In obtaining motion from water by the application of heat thereto, the process consisting of subjecting the water to heat in a high-pressure boiler, of using the steam resulting therefrom in a high-pressure engine, of discharging the used steam into a low-pressure boiler through separate discharge-pipes from each exhaust-port of said engine, each of said pipes having a check-valve therein between said engine and said low-pressure boiler, of transferring the heated water obtained in said low-pressure boiler into the high-pressure boiler through suitable connections, and of supplying the fire-box of said high-pressure boiler with steam or other products of the application of heat to water from openings or holes in said low-pressure boiler connecting with said fire-box, with air passing from the open air through openings or flues through the water-legs or space surrounding the fire-box of the high-pressure boiler to said fire-box, and with coal from a flue or magazine passing from above said fire-box through said high-pressure boiler to the open air, all substantially as described, and for the purpose set forth.

9. In obtaining motion from water by the application of heat thereto, the process consisting of subjecting the water to heat in a high-pressure boiler, of using the steam resulting therefrom in a high-pressure engine, of discharging the used steam into a low-pressure boiler through a discharge-pipe from the exhaust port or ports of said engine, said pipe having a suitable check-valve interposed between said engine and said low-pressure boiler, of transferring the heated water obtained in said low-pressure boiler into said high-pressure boiler through proper connections, and of supplying the furnace of said high-pressure boiler with air through flues in said low-pressure boiler, with air through openings or flues from the open air to said fire-box through the water-legs or space surrounding said fire-box, and with steam or other products of the application of heat to water from openings or holes in said low-pressure boiler connecting with the fire-box, and with coal from a flue or magazine passing from above said fire-box through said high-pressure boiler to the open air, all substantially as described, and for the purpose set forth.

10. In obtaining motion from water by the application of heat thereto, the process consisting of subjecting the water to heat in a high-pressure boiler, of using the steam resulting therefrom in a high-pressure engine, of discharging the used steam from the exhaust port or ports of said engine through a discharge-pipe having a check-valve therein between said engine and the end of said pipe, and of supplying the fire-box of said high-pressure engine with coal from a flue or magazine extending from above said fire-box through said high-pressure boiler to the open air, all substantially as described, and for the purpose set forth.

11. In obtaining motion from water by the application of heat thereto, the process consisting of subjecting the water to heat in a high-pressure boiler, of using the steam resulting therefrom in a high-pressure engine, of discharging into a low-pressure boiler the used steam from each exhaust-port of said engine into a low-pressure boiler through a discharge-pipe having a check-valve therein between said engine and said low-pressure boiler, of transferring the heated water obtained in said low-pressure boiler into said high-pressure boiler through suitable connections, and of supplying the fire-box of said high-pressure engine with coal from a flue or magazine extending from above said fire-box through said high-pressure boiler to the open air, all substantially as described, and for the purpose set forth.

12. In obtaining motion from water by the application of heat thereto, the process consisting of subjecting the water to heat in a high-pressure boiler, of using the steam resulting therefrom in a high-pressure engine, of discharging the used steam through separate discharge-pipes from each exhaust-port of said engine into a low-pressure boiler, each of said pipes having a check-valve interposed between said engine and said low-pressure boiler, of transferring the heated water obtained in said low-pressure boiler into the high-pressure boiler through suitable connections, and of supplying the furnace of said high-pressure boiler with air passing through openings or flues through the water-legs or space surrounding said fire-box from the open air to said fire-box, and with coal from a flue or magazine extending from above said fire-box through said high-pressure boiler to the open air, all substantially as described, and for the purpose set forth.

13. In obtaining motion from water by the application of heat thereto, the process consisting of subjecting the water to heat in a high-pressure boiler, of using the steam resulting therefrom in a high-pressure engine, of discharging the used steam into a low-pressure boiler from the exhaust port or ports of said engine through a discharge pipe or pipes having a suitable check-valve therein interposed between said engine and said reservoir, and of supplying the furnace of said high-pressure boiler with air passed through flues in said low-pressure boiler, all substantially as described, and for the purpose set forth.

14. The process of obtaining motion from water by the application of heat thereto, consisting of subjecting the water to heat in a high-pressure boiler, of using the steam resulting therefrom in a high-pressure engine, of discharging the used steam into a low-pressure boiler from the exhaust port or ports of said engine through a discharge pipe or pipes having a suitable check-valve therein interposed between said engine and said reservoir, and of supplying the furnace of said high-pressure boiler with steam or other products of the application of heat to water from openings or holes in said low-pressure boiler connecting with the fire-box of said furnace, all substantially as described, and for the purpose set forth.

15. The process of obtaining motion from water by the application of heat thereto, consisting of subjecting the water to heat in a high-pressure boiler, of using the steam resulting therefrom in a high-pressure engine, of discharging the used steam into a low-pressure boiler from the exhaust port or ports of said engine through a discharge pipe or pipes having a check-valve therein interposed between said engine and said reservoir, and of supplying the furnace of said high-pressure boiler with steam or other products of the application of heat to water from openings or holes in said low-pressure boiler connecting with the fire-box of said furnace, and with air passing through openings or flues through the water-legs or space surrounding the fire-box from the open air to said fire-box, all substantially as described, and for the purpose set forth.

TREAT T. PROSSER.

Witnesses:
F. L. BROWN,
FRANK S. OSBORNE.